United States Patent [19]

Green et al.

[11] 4,124,760

[45] Nov. 7, 1978

[54] PHOTOPOLYMERIZABLE DIEPOXIDES CONTAINING A NITROGEN HETEROCYCLE

[75] Inventors: George E. Green; Bernard P. Stark, both of Stapleford; John S. Waterhouse, Cherry Hinton, all of England

[73] Assignee: Ciba-Geigy Corporation, Ardsley, N.Y.

[21] Appl. No.: 815,332

[22] Filed: Jul. 13, 1977

[30] Foreign Application Priority Data

Jul. 20, 1976 [GB] United Kingdom ............... 30100/76

[51] Int. Cl.$^2$ ........................................... C07D 405/14
[52] U.S. Cl. .................................... 542/432; 544/296; 544/300; 544/302; 544/310; 528/393; 528/117; 548/308; 548/318; 542/436; 544/314; 544/316; 544/318
[58] Field of Search ...................... 260/260, 257, 2 EP; 548/308, 318; 542/432, 436; 526/11.2

[56] References Cited

U.S. PATENT DOCUMENTS

| | | |
|---|---|---|
| 3,789,405 | 1/1974 | Porret et al. ......................... 260/260 |
| 3,799,894 | 3/1974 | Porret et al. ......................... 260/260 |
| 3,843,675 | 10/1974 | Porret et al. ......................... 260/260 |
| 3,846,442 | 11/1974 | Habermeier et al. ................ 260/260 |
| 3,852,302 | 12/1974 | Habermeier et al. ................ 260/260 |
| 3,864,357 | 2/1975 | Porret et al. ......................... 260/260 |
| 3,948,916 | 4/1976 | Porret et al. ......................... 260/260 |

FOREIGN PATENT DOCUMENTS 2,300,542  7/1974  Fed. Rep. of Germany.
1,090,142  11/1963  United Kingdom.

*Primary Examiner*—Allen B. Curtis
*Attorney, Agent, or Firm*—Joseph F. DiPrima; Vincent J. Cavalieri

[57] ABSTRACT

Diepoxides which may be photopolymerized in the presence or absence of a photosensitizer contain a group having conjugated unsaturation attached to a nitrogen heterocycle, such as a hydantoin or barbituric acid residue, forming part of an advanced diepoxide. The resultant photopolymer may be crosslinked by heating in the presence of a curing agent for epoxide resins.

The diepoxides are of use in the production of printing plates and printed circuits, especially multilayer printed circuits.

8 Claims, No Drawings

PHOTOPOLYMERIZABLE DIEPOXIDES CONTAINING A NITROGEN HETEROCYCLE

BACKGROUND OF THE INVENTION

This invention relates to unsaturated diepoxides which polymerise on exposure to actinic radiation, to methods of producing such diepoxides and of polymerising them by means of actinic radiation, to supports bearing thereon such a diepoxide in the polymerisable state, and to supports bearing thereon such a diepoxide polymerised by means of actinic radiation.

Substances capable of becoming polymerised on exposure to actinic radiation are used in, for example, the preparation of printing plates for offset printing and of printed circuits, and for coating metals, such as in the manufacture of cans (see, e.g., Kosar, "Light-sensitive systems: Chemistry and Applications of non-silver halide Photographic Processes", Wiley, New York, 1965; Delzene, "Synthesis and Photocrosslinking of Light-sensitive Polymers", European Polym. J., Suppl. 1969, pp. 55–91; Williams, "Photopolymerisation and Photocrosslinking of Polymers", Forschr. Chem. Forsch., Vol. 13 (2), 227–250). There are various drawbacks in the substances presently available which may be polymerised by exposure to actinic radiation. Some are so unstable that they must be applied to a substrate only immediately prior to exposing them to actinic radiation. Others are relatively insensitive and need lengthy exposure to actinic radiation in order to become sufficiently polymerised. Others, after being polymerised, are not resistant to etching baths used in subsequent processes.

Most previously known substances which polymerise on exposure to actinic radiation are used with a photosensitiser such as Michler's ketone (bis(p-dimethylamino)benzophenone), benzoin, or an alkyl ether of benzoin, to shorten the exposure time required for polymerisation. However, the sensitiser alters the electrical properties of the polymer, and may volatilise on being heated, so making it unsuitable for use in multilayer laminates; in the preparation of these, therefore, the polymer is removed after the metal etching process has taken place, which removal adds to the cost of the laminates and may cause damage to the surface of the metal.

DETAILED DISCLOSURE

We have now found that these drawbacks can be at least substantially overcome by the use of certain novel diepoxides, in the photopolymerisation of which a photosensitiser is usually not required.

The aforesaid diepoxides contain a group having conjugated unsaturation attached to a nitrogen heterocycle forming part of an advanced diepoxide. The new diepoxides which constitute one aspect of this invention may be represented by the formula

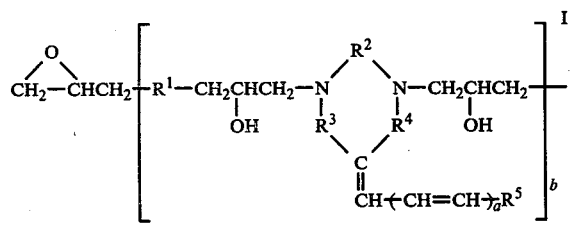

-continued

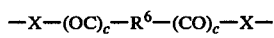

where each $R^1$ represents a residue of formula $$-X-(OC)_c-R^6-(CO)_c-X- \quad \text{II}$$

or

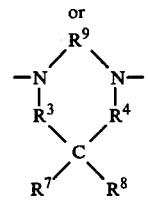    III $R^2$ represents a carbonyl group, $R^3$ represents a single bond joining the indicated nitrogen atom and carbon atom, a carbonyl group, or a methylene or ketomethylene group, which may be substituted by halogen atoms, alkyl or alkoxy groups of 1 to 4 carbon atoms, or hydroxy groups, $R^4$ represents a carbonyl group or a methylene or ketomethylene group, which may be substituted by halogen atoms, alkyl or alkoxy groups of 1 to 4 carbon atoms, or hydroxy groups, $R^5$ represents a group having ethylenic unsaturation or aromaticity in conjugation with the indicated double bond attached to the carbon atom shown in the heterocyclic ring, $R^6$ represents a divalent aliphatic, aromatic, or heterocyclic group which may be interrupted by oxygen or sulphur atoms or secondary or tertiary amino groups, $R^7$ and $R^8$, which may be the same of different, each represent a hydrogen atom, an alkyl group of 1 to 6 carbon atoms, or together represent a pentamethylene or hexamethylene group, $R^9$ represents a carbonyl group or a ketomethylene group, at least one of $R^3$ and $R^4$ having a carbonyl group adjacent to the indicated carbon atom in the heterocyclic ring and $R^3$, $R^4$, and $R^9$ being selected such that the indicated heterocycle is a 5- or 6-membered ring, X represents an oxygen or sulphur atom or a secondary or tertiary amino group, $a$ represents zero, 1, or 2, $b$ represents an integer such that the average molecular weight of the diepoxide of formula I is from 500 to 50,000, preferably from 2,000 to 10,000, and both $c$ are zero or, if X represents an oxygen atom, one or both may alternatively represent 1.

"Aromaticity" is used herein the sense of properties associated with structures having $(4n + 2) \pi$ electrons, where $n$ is the number of rings in the structure; heterocyclic groups, such as the 2-pyridyl group, which exhibit aromatic properties are hence included, as well as benzenoid groups such as the phenyl group.

Another aspect of this invention comprises a process for the preparation of diepoxides of formula I which comprises advancement with $b$ mol. of a heterocycle having the formula

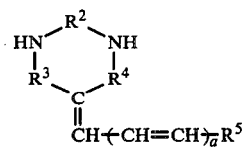  IV of (b + 1) mol. of a diepoxide having the formula

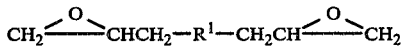  V or of b mol. of a diepoxide having the formula

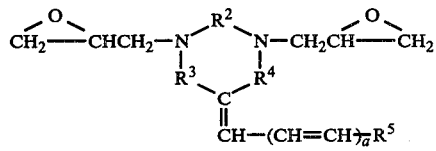  VI with (b + 1) mol. of a compound having the formula

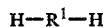  VII where $R^1$ - $R^5$ and $a$ have the meanings assigned above.

One class of preferred diepoxides of formula I are those wherein $R^1$ represents a group of formula II, in which each X represents an oxygen atom, and either each $c$ is zero, and $R^6$ represents a straight or branched chain hydrocarbon group of from 2 to 6 carbon atoms or a group of formula

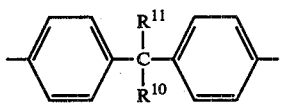  VIII where $R^{10}$ and $R^{11}$, which may be the same or different, each represent a hydrogen atom or an alkyl group of 1 to 4 carbon atoms, or both $c$ are 1 and $R^6$ represents a group of formula

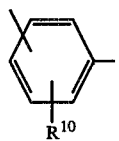  IX where $R^{10}$ has the meaning previously assigned.

The second class of preferred diepoxides of formula I are those wherein $R^1$ represents a group of formula III, in which $R^9$ and $R^4$ each represent a carbonyl group and $R^3$ represents a single bond or a carbonyl group.

Further preferred diepoxides of formula I are those wherein $R^5$ represents a monocyclic or bicyclic benzenoid or aromatic heterocyclic group, especially phenyl, α-naphthyl, 2-pyridyl, 3-pyridyl, or 2-furyl.

Photopolymerisable diepoxides have previously been described, for example in British patent specification No. 1090142 and West German Offenlegungsschrift No. 2300542. However, in these specifications the photopolymerisable unsaturated groups were attached by reaction with free hydroxyl groups resulting from epoxide ring opening or advancement. This method of introducing photopolymerisable groups is not completely satisfactory since it is difficult to obtain complete substitution on the hydroxy groups, leading to variations in photopolymerisable properties from batch to batch. Also, there is a risk of chain degradation and loss of epoxide functionality due to side reactions. Finally, reactions with advanced epoxide resins are difficult to carry out, since they are not soluble in many common organic solvents such as ethanol.

Such problems are not encountered in making the photopolymerisable diepoxides of the present invention, since the group inducing photopolymerisability is introduced prior to advancement.

Thus, a nitrogen heterocycle having an active methylene group, of formula

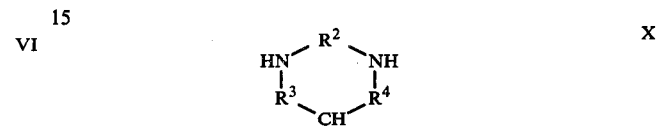  X may be subjected to a Knoevenagel condensation with an unsaturated aldehyde of formula

  XI to form the substituted heterocycle of formula IV, where $R^2$, $R^3$, $R^4$, $R^5$, and $a$ are as hereinbefore defined.

Compounds of formula IV are, in general, known.

This reaction may be effected by the usual method for a Knoevenagel condensation, i.e., in the presence of a basic catalyst such as pyridine, an alkali metal hydroxide, or an alkali metal salt of an organic acid in solution in that acid, especially sodium acetate in acetic acid.

Usually, in the advancement reaction, the diepoxide of formula V is heated with the heterocycle of formula IV at a temperature of from 100° to 200° C., and especially 120° to 170° C., and preferably for a period of from ½ to 20 hours, especially from 1 to 6 hours.

The reaction can be accelerated by adding a catalyst for the advancement. Such catalysts are, for example, alkali metal hydroxides such as sodium hydroxide; alkali metal halides such as lithium chloride, potassium chloride, or sodium chloride, bromide, or fluoride; tertiary amines such as triethylamine, tri-n-propylamine, N-benzyldimethylamine, N,N-dimethylaniline, and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate, and methyltriethylammonium chloride; and hydrazines having a tertiary nitrogen atom, such as 1,1-dimethylhydrazine, which can also be employed in their quaternised form.

An inert solvent may also be present. 2-Ethoxyethanol is particularly suitable.

Depending on the choice of the starting substances, the reaction in some cases takes place quantitatively so rapidly that no addition of catalyst is necessary. Whilst the starting materials are generally mixed with one another at room temperature and are then brought to the reaction temperature, it is advantageous in the case of very reactive components if the diepoxide of formula V is first introduced and heated by itself to the requisite reaction temperature and the heterocycle of formula IV is then gradually added in small portions. The progress of the reaction up to the end product having a defined epoxide group content which essentially remains constant can be followed by titration of the epoxide groups using samples taken during the reaction.

Such advancement reactions are known (see, e.g., British patent specifications Nos. 1230889 and 1237610).

As examples of suitable diepoxides of formula V may be mentioned various diglycidyl compounds such as diglycidyl esters obtainable by reaction of a compound containing two carboxylic acid groups per molecule with epichlorohydrin or glycerol dichlorohydrin in the presence of an alkali. These diglycidyl esters may be derived from aliphatic carboxylic acids, e.g., glutaric acid, adipic acid, pimelic acid, suberic acid, azelic acid, sebacic acid, or dimerised linoleic acid; from cycloaliphatic carboxylic acids such as tetrahydrophthalic acid, 4-methyltetrahydrophthalic acid, hexahydrophthalic acid, and 4-methylhexahydrophthalic acid; and from aromatic carboxylic acids such as phthalic acid, isophthalic acid, and terephthalic acid.

Further examples of suitable diglycidyl compounds are glycidyl ethers obtainable by reaction of a compound containing two alcoholic hydroxyl or phenolic hydroxyl groups per molecule with epichlorohydrin or glycerol dichlorohydrin under alkaline conditions, or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, and hexane-1,6-diol; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 2,2-bis(4-hydroxyphenyl)propane (otherwise known as bisphenol A), and 2,2-bis(3,5-dibromo-4-hydroxyphenyl)propane.

Suitable di(N-glycidyl) compounds include those obtained by dehydrochlorination of the reaction products of epichlorohydrin with amines containing two amino-hydrogen atoms, such as aniline, n-butylamine, and bis(4-methylaminophenyl)methane; and N,N'-diglycidyl derivatives of cyclic ureas, such as those of hydantoins, uracils, dihydrouracils, parabanic acid, bis(-hydantoin-1-yl)alkanes, ethyleneureas (imidazolidin-2-ones), and 1,3-propyleneureas (hexahydro-2H-pyrimidin-2-ones).

Examples of suitable di(S-glycidyl) compounds are di-S-glycidyl derivatives of dithiols such as ethane-1,2-dithiol and bis(4-mercaptomethylphenyl) ether.

Epoxide resins having the glycidyl groups attached to different kinds of hetero atoms may be employed, e.g., the glycidyl ether-glycidyl ester of salicylic acid and N-glycidyl-N'-(2-glycidyloxypropyl)-5,5-dimethylhydantoin.

Alternatively, heterocycles of formula IV are converted into N,N'-diglycidyl compounds of formula VI (which are believed to be, in general, novel) by methods known per se for the formation of their N,N'-diglycidyl derivatives from hydantoins and similar heterocycles and, as already indicated, $b$ mol of such a diepoxide is advanced by means of a compound of formula VII. The advancement may be carried out in a similar manner to that of the diepoxide of formula V with the heterocycle of formula IV; thus, the compounds of formulae VII and VI may be heated together at a temperature of from 100° to 200° C., especially from 120° to 170° C., and preferably from ½ to 20 hours, especially 1 to 6 hours, and preferably an advancement catalyst such as those specified above is employed.

The unsaturated diepoxides of the present invention are polymerised by exposure to actinic radiation, preferably of wavelength 200–600 nm. If desired, the irradiated material may then be crosslinked through the epoxide groups by reaction with a polycarboxylic acid anhydride or other heat-curing agent for epoxide resins, especially a latent curing agent, i.e., one which has little or no effect at room temperature but which rapidly induces crosslinking when a certain threshold temperature is exceeded, e.g., dicyandiamide, a boron difluoride chelate, or a complex of a tertiary amine with boron trifluoride or with boron trichloride. Such additional cross-linking often enhances the adhesion of the polymerised composition to the support.

The unsaturated diepoxides of this invention are of particular value in the production of printing plates and printed circuits, especially multilayer printed circuits which can be prepared without removal of the photopolymerised diepoxide. A layer of the diepoxide may be applied to a support by coating the support with a solution of the diepoxide in any convenient solvent, e.g., cyclohexanone, 2-ethoxyethanol, or a mixture of toluene and acetone or ethyl methyl ketone, and allowing the solvent to evaporate; the layer may be applied by dipping, spinning or spin-coating (a process in which the material in put on a plate which is then rotated at high speed to distribute the material over it), spraying, or by means of a roller.

This invention also includes a plate sensitive to actinic radiation comprising a support, which may be of, for example, copper, aluminum or other metal, paper, synthetic resin, or glass, carrying a layer of such a diepoxide, admixed if desired with a heat-curing agent for epoxide resins, also a support bearing upon its surface such a diepoxide which has been polymerised by exposure to actinic radiation, and further, if desired, crosslinked by means of a heat-curing agent for epoxide resins. It also provides a method of polymerising such a diepoxide which comprises subjecting a plate carrying a layer of the diepoxide to actinic radiation, optionally imagewise as through a negative, and removing the unpolymerised portions, if any, of the diepoxide by means of a solvent.

The coating of the diepoxide should be applied to the support so that, uppon drying, its thickness will be in the range of from about 1 to 250 μm. The thickness of the polymerisable layer is a direct function of the thickness desired in the relief image, which will depend on the subject being reproduced and particularly on the extent of the non-printing areas. The wet polymer coating may be dried by air drying or by any other known drying technique, and the polymerisable system may then be stored until required for use.

The polymerisable coatings can be insolubilised by exposure to actinic radiation through an image-bearing transparency consisting of substantially opaque and transparent areas. Suitable sources of actinic radiation include carbon arcs, mercury vapour arcs, fluorescent lamps with phosphors emitting ultra-violet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the diepoxide will depend upon a variety of factors which include, for example, the individual diepoxide being utilised, the thickness of the coating, the type of light source, and its distance from the coating.

Subsequent to the exposure the coatings are "developed" by being washed with a suitable liquid, such as perchloroethylene, methylene chloride, ethylene dichloride, chloroform, actone, ethyl methyl ketone, cyclohexanone, n-propanol, ethanol, toluene, benzene, ethyl acetate, dimethylformamide, and mixtures thereof, to dissolve and remove that portion of the coating which was not polymerised by exposure to actinic radiation. Liquids used for this operation must be selected with care since they should have good solvent action on the unexposed areas yet have little effect upon either the polymerised diepoxide or the substrate. The developing solvent should normally be allowed to remain in contact with the coating for from about 30 seconds to 3 minutes, depending upon which solvent is utilised. The developed polymer coating should next be rinsed with fresh solvent and dried.

If appropriate, such as in the production of printed circuits where the support is of copper or of other suitable electrically-conducting metal, the exposed metal is etched in a conventional manner using, e.g., ferric chloride or ammonium persulphate solutions.

As already indicated, the diepoxide is preferably crosslinked through its epoxide groups after exposure to actinic radiation. To crosslink the composition it is heated after development, generally at a temperature of from 100° to 200° C.

The following Examples illustrate the invention. All temperatures are in degrees Celsius. Epoxide contents were measured by titration against a 0.1N solution of perchloric acid in glacial acetic acid in the presence of excess of tetraethylammonium bromide, crystal violet being used as the indicator. By the term 'solids content' is meant the percentage of material left after a 2g sample has been heated in an open dish at 120° for 3 hours.

EXAMPLE 1

A solution of hydantoin (40 g), freshly distilled cinnamaldehyde (50 g), and fused sodium acetate (80 g) in acetic acid (160 ml) was heated to reflux for 1½ hours. The solution was poured into cold water (1.5 l) to precipitate the orange product, which was removed by filtration. This product was washed with water until neutral and then with cold ethanol to give 69 g (85% theoretical yield) of virtually pure product. Before use, the product was recrystallised from ethanol to give yellow crystals of 5-cinnamylidenehydantoin, m.p. 268°–270° (decomp.), the infra-red spectrum of which showed the expected main peaks at 1750, 1700, 1640, 1390, 1350, 1020, 970, 895, 825, 750, 690, and 655 cm$^{-1}$.

Found: C, 67.05%, H, 4.52%; N, 12.8%. $C_{12}H_{10}N_2O_2$ requires C, 67.29%; H, 4.67%; N, 13.08%.

The structure assigned was confirmed by $C^{13}$ NMR data.

A mixture of 5-cinnamylidenehydantoin (20 g), 1,3-diglycidyl-5,5-dimethylhydantoin of epoxide content 8.12 equiv./kg (24 g), tetramethylammonium chloride (0.2 g), and 2-ethoxyethanol (66 g) was stirred at 120° for 5 hours, by which time the epoxide content of the product was 0.55 equiv./kg (based on the solids content of the solution).

The product is substantially of formula I in which $R^1$ denotes a group of formula

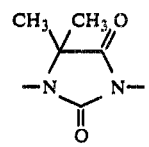

XII $R^2$ and $R^4$ denote carbonyl groups, $R^3$ denotes a single bond, $R^5$ denotes a phenyl group, $a$ is 1, and $b$ is an integer of average value 8.

A copper-clad laminate was coated with a portion of the solution, and the solvent was allowed to evaporate, leaving a film about 10 μm thick. This film was irradiated for 3 minutes through a negative using a 500 watt medium pressure mercury lamp at a distance of 230 mm. After irradiation, the image was developed by washing with 2-ethoxyethanol at 20°, which removed the unexposed areas of the film. Uncoated copper areas were then etched using an aqueous solution of ferric chloride (60% w/v $FeCl_3$) containing concentrated hydrochloric acid (10% v/v), leaving a good relief image.

EXAMPLE 2

A mixture of 5-cinnamylidenehydantoin (4.0 g), 2,2-bis(4-glycidyloxyphenyl)propane of epoxide content 5.3 equiv./kg (7.0 g), tetramethylammonium chloride (0.02 g), and 2-ethoxyethanol (16.6 g) was stirred at 120° for 3 hours, by which time the epoxide content of the product was 0.51 equiv./kg (based on the solids content of the solution).

The product is substantially of formula I in which $R^1$ denotes a group of formula

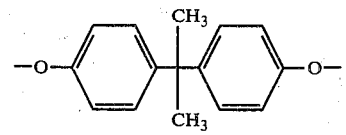

XIII $R^2$ and $R^4$ both denote carbonyl groups, $R^3$ denotes a single bond, $R^5$ denotes a phenyl group, $a$ is 1, and $b$ is an integer of average value 7.

The product was tested as described in Example 1, and a good relief image was obtained after 6 minutes' irradiation and development in 2-ethoxyethanol.

EXAMPLE 3

A solution of hydantoin (10 g), fused sodium acetate (20 g), and freshly distilled furfural (12 g) in acetic acid (40 ml) was heated under reflux for 1¼ hours. The dark solution was poured into cold water (400 ml) to precipitate the dark green/yellow product, which was washed with water until neutral and then with cold ethanol to give 14 g (80% theoretical yield) of 5-furfurylidenehydantoin m.p. 232°–5° (decomp.) (H. L. Wheeler and C. Hoffman, *Amer. Chem. J.*, 1911, 45, 368, quote m.p. 232°.) The material was used without further purification.

A mixture of 5-furfurylidenehydantoin (5.0 g), 1,3-diglycidyl-5,5-dimethylhydantoin of epoxide content 8.2 equiv./kg (7.0 g), tetramethylammonium chloride (0.02 g), and 2-ethoxyethanol (20.0 g) was stirred at 120° for 2 hours, by which time the epoxide content of the product (based on the solids content of the solution) was 0.6 equiv./kg.

The product is substantially of formula I in which $R^1$ denotes a group of formula XII, $R^2$ and $R^4$ both denote carbonyl groups, $R^3$ denotes a single bond, $R^5$ denotes a 2-furyl group, $a$ is zero, and $b$ is an integer of average value 8.

The solution was tested as described in Example 1, and a good relief image was obtained after 6 minutes' irradiation and development in a 1:1 (v/v) mixture of 2-ethoxyethanol and dimethylformamide.

EXAMPLE 4

Barbituric acid (10.0 g) was dissolved in water (150 ml) at reflux, and the solution was stirred vigorously and maintained at just below refluxing point while freshly distilled cinnamaldehyde (10.3 g) was added slowly: a yellow precipitate formed almost immediately. After the addition, the mixture was stirred and maintained at just below refluxing point for 1 hour to complete the reaction. The product was filtered off, washed several times with hot water and then with cold ethanol, and then dried to give yellow 5-cinnamylidenebarbituric acid (18 g, 96% theoretical yield) m.p. 268°–70° (decomp).

Found: C, 64.19%; H, 4.41%; N, 11.50%. $C_{13}H_{10}N_2O_3$ requires C, 64.46%; H, 4.13%; N, 11.57%.

I.r. spectrum (main peaks): 1750, 1660, 1600, 1575, 1430, 1410, 1390, 1315, 1220, 1178, 1000, 795, 752, 685 cm$^{-1}$.

The structure assigned was confirmed by $C^{13}$ NMR data.

The material was pure enough to use without further purification.

A mixture of 5-cinnamylidenebarbituric acid (6.0 g), butane-1,4-diol diglycidyl ether of epoxide content 9.12 equiv./kg (5.4 g), tetramethylammonium chloride (0.02 g), 2-ethoxyethanol (17 g), and dimethylformamide (2.0 g) was stirred at 130° for 5½ hours, by which time the epoxide content of the product was 0.7 equiv./kg (based on the solids content of the solution).

The product is substantially of formula I in which $R^1$ denotes a group

$$-O-(CH_2)_4-O-\qquad XIV$$

$R^2$, $R^3$, and $R^4$ all denote carbonyl groups, $R^5$ denotes a phenyl group, $a$ is 1, and $b$ is an integer of average value 6.

The solution was tested according to Example 1, and a good relief image was obtained after 6 minutes' irradiation and development in 2-ethoxyethanol.

EXAMPLE 5

To 2 g of the resin solution prepared in Example 1 was added dicyandiamide (0.04 g). A copper-clad laminate was coated with the composition, and the solvent was allowed to evaporate, leaving a film. This film was irradiated through a negative, as described in Example 1, and developed in 2-ethoxyethanol to give a good relief image. The plate was heated at 180° for 2 hours: the coating of the polymer in the image areas had very good adhesion to the copper, and very good solvent resistance; thus, it passed the standard acetone rub test, i.e., twenty rubs with a cotton-wool swab soaked in acetone did not remove any of the coating.

EXAMPLE 6

A mixture of 5-cinnamylidenehydantoin (2.1 g; prepared as described in Example 1), diglycidyl hexahydrophthalate of epoxide content 6.5 equiv./kg (3.5 g), tetramethylammonium chloride (0.02 g), and 2-ethoxyethanol (13.0 g) was stirred at 130° for 6 hours, by which time the epoxide content of the product was 0.2 equiv./kg (based on the solids content of the solution).

The product is substantially of formula I where $R^1$ denotes a group of formula

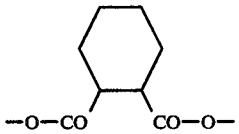
XV $R^2$ and $R^4$ both denote carbonyl groups, $R^3$ denotes a single bond, $R^5$ denotes a phenyl group, $a$ denotes 1, and $b$ denotes an integer of average value 21.

The solution was tested according to Example 1, and a good relief image was obtained after 15 minutes' irradiation and development in cyclohexanone.

EXAMPLE 7

A mixture of hydantoin (5.0g), sorbaldehyde (4.8g), water (30 ml), and ethanol (30 ml) was stirred and heated to 70°, giving a clear solution. Ethanolamine (4.6g) in ethanol (10 ml) was added dropwise at 70°, and after a few minutes the solution had turned deep red. After the addition, the solution was stirred at 85° for 4 hours. Concentrated hydrochloric acid was then added to the solution until its pH was approximately 4, and on cooling a yellow product crystallized; this was removed by filtration. The product was recrystallized from ethanol to give yellow 5-(2',4'-hexadienylidene)hydantoin m.p. 234°–5°.

I.r. spectrum (main peaks): 1720, 1650, 1615, 1585, 1360, 1320, 1210, 1090, 980, 880, 760, 700, 645 cm$^{-1}$.

A mixture of 5-(2',4'-hexadienylidene)hydantoin (2.2 g), 1,3-diglycidyl-5,5-dimethylhydantoin of epoxide content 8.12 equiv./kg (3.1 g), tetramethylammonium chloride (0.02 g), and 2-ethoxyethanol (12.4 g) was stirred at 130° for 4 hours and at 105° for 16 hours, by which time the epoxide content of the product was 0.80 equiv./kg (based on the solids content of the solution).

The product is substantially of formula I where $R^1$ denotes a group of formula XII, $R^2$ and $R^4$ both denote carbonyl groups, $R^3$ denotes a single bond, $R^5$ denotes a group $-CH=CH-CH_3$, $a$ is 1, and $b$ is an integer of average value 6.

Michler's ketone (0.02 g) was dissolved in 2 g of the solution and the composition was tested as described in Example 1. A good relief image was obtained after 20 minutes' irradiation and development in cyclohexanone.

EXAMPLE 8

To a suspension of 5-cinnamylidenehydantoin, (9.0 g; prepared as described in Example 1) in epichlorohydrin (200 g) was added a solution of tetramethylammonium chloride (0.06 g) in water (0.1 g). The mixture was stirred vigorously and heated, and the pressure was reduced so that the solvent refluxed at 55°. Sodium hydroxide (3.9g) in 50% aqueous solution was added dropwise over a period of 2 hours, and water formed during condensation was removed from the azeotropic mixture. Refluxing was continued at 55° for a further 2 hours.

The product was washed several times with water until clear and neutral, and then dried ($MgSO_4$). Removal of the solvent gave 1,3-diglycidyl-5-cinnamylidenehydantoin (12.5 g) of epoxide content 5.3 equiv./kg, as a dark orange solid.

A mixture of the above product (3.6 g), 5,5-dimethylhydantoin (1.0 g), tetramethylammonium chloride (0.01 g), and 2-ethoxyethanol (9 g) was stirred at 130° for 4 hours, by which time the epoxide content of the product was 0.65 equiv./kg (based on the solids content of the solution)

The product is substantially the same as that described in Example 1, but in which $b$ is an integer of average value 6.

The solution was tested as described in Example 1, and a relief image was obtained after 15 minutes' irradiation and development in chloroform.

We claim:

1. Diepoxides of the formula

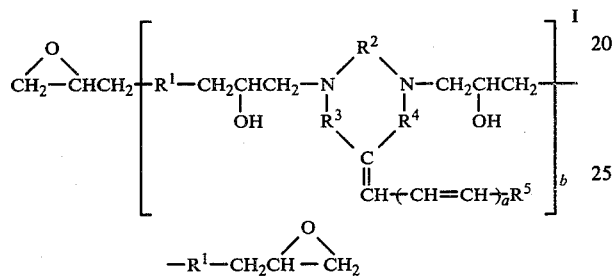

where
each $R^1$ represents a residue of formula

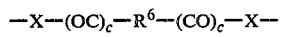

or

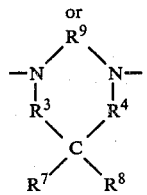

$R^2$ represents a carbonyl group, $R^3$ represents a single bond joining the indicated nitrogen atom and carbon atom, a carbonyl group, a methylene group, a ketomethylene group, or a methylene or ketomethylene group substituted by at least one and at most two substituents which are halogen atoms, alkyl or alkoxy groups of 1 to 4 carbon atoms, or hydroxy groups, $R^4$ represents a carbonyl group, a methylene group, a ketomethylene group, or a methylene or ketomethylene group substituted by at least one and at most two substituents which are halogen atoms, alkyl or alkoxy groups of 1 to 4 carbon atoms, or hydroxy groups, $R^5$ represents an aliphatic group of 2 to 10 carbon atoms having ethylenic unsaturation in conjugation with the indicated double bond attached to the carbon atom shown in the heterocyclic ring, or an aromatic group of up to 10 carbon atoms having its aromaticity in conjugation with the indicated double bond attached to the carbon atom shown in the heterocyclic ring, $R^6$ represents a divalent aliphatic, aromatic, or heterocyclic group; a divalent aliphatic group having an oxygen atom, sulfur atom, secondary amino group or tertiary amino group within the carbon chain; an aromatic group having oxygen atoms, sulfur atoms, secondary amino groups or tertiary amino groups linking aromatic rings; or a heterocyclic group having oxygen atoms, sulfur atoms or secondary amino groups or tertiary amino groups linking heterocyclic rings, $R^7$ and $R^8$, which may be the same or different, each represent a hydrogen atom, an alkyl group of 1 to 6 carbon atoms, or together represent a pentamethylene or hexamethylene group, $R^9$ represents a carbonyl group or a ketomethylene group at least one of $R^3$ and $R^4$ having a carbonyl group adjacent to the indicated carbon atom in the heterocyclic ring and $R^3$, $R^4$, and $R^9$ being selected such that the indicated heterocycle is a 5 or 6 membered ring.

X represents an oxygen atom, a sulfur atom, a secondary amino group, or tertiary amino group, $a$ represents zero, 1, or 2, $b$ represents an integer such that the average molecular weight of the diepoxide is from 500 to 50,000, and $c$ is zero or one, such that $c$ may only represent 1 when X represents an oxygen atom.

2. Diepoxides according to claim 1, in which $R^1$ represents a residue of formula II wherein each X represents an oxygen atom, both $c$ are zero, and $R^6$ represents a straight or branched chain hydrocarbon group of from 2 to 6 carbon atoms or a group of formula

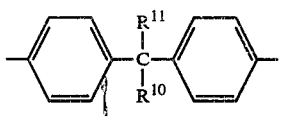

where $R^{10}$ and $R^{11}$, which may be the same or different, each represent a hydrogen atom or an alkyl group of 1 to 4 carbon atoms.

3. Diepoxides according to claim 1, in which $R^1$ represents a residue of formula II wherein each X represents an oxygen atom, both $c$ are 1, and $R^6$ represents a group of formula

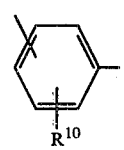

where $R^{10}$ is a hydrogen atom or an alkyl group of 1 to 4 carbon atoms.

4. Diepoxides according to claim 1, in which $R^1$ represents a group of formula III wherein $R^4$ and $R^9$ each represent a carbonyl group and $R^3$ represents a single bond or a carbonyl group.

5. Diepoxides according to claim 1, wherein $R^5$ represents a monocyclic or bicyclic benzenoid or aromatic heterocyclic group.

6. Diepoxides according to claim 5, in which $R^5$ represents phenyl, α-naphthyl, 2-pyridyl, 3-pyridyl, or 2-furyl.

7. Diepoxides according to claim 1, in which $b$ is an integer such that the average molecular weight of the diepoxide is from 2,000 to 10,000.

8. Diepoxides according to claim 1, in which $R^1$ denotes a group of formula

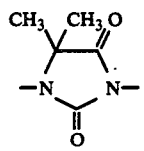
XII $R^2$ and $R^4$ both denote carbonyl groups,
$R^3$ denotes a single bond,
$R^5$ denotes a phenyl group,
$a$ is 1, and
$b$ is an integer of average value 8, or
$R^1$ denotes a group of formula

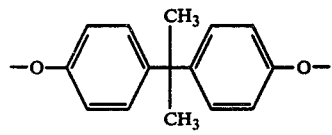

$R^2$ and $R^4$ both denote carbonyl groups,
$R^3$ denotes a single bond,
$R^5$ denotes a phenyl group,
$a$ is 1, and
$b$ is an integer of average value 7, or
$R^1$ denotes a group of formula XII,
$R^2$ and $R^4$ both denote carbonyl groups,
$R^3$ denotes a single bond,
$R^5$ denotes 2-furyl,
$a$ is zero, and
$b$ is an integer of average value 8, or
$R^1$ denotes a group —O—$(CH_2)_4$—O—,
$R^2$, $R^3$, and $R^4$ all denote carbonyl groups,
$R^5$ denotes a phenyl group,
$a$ is 1, and
$b$ is an integer of average value 6, or
$R^1$ denotes a group of formula

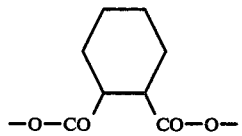
XV $R^2$ and $R^4$ both denote carbonyl groups,
$R^3$ denotes a single bond,
$R^5$ denotes a phenyl group,
$a$ denotes 1, and
$b$ denotes an integer of average value 21, or
$R^1$ denotes a group of formula XII,
$R^2$ and $R^4$ both denote carbonyl groups,
$R^3$ denotes a single bond,
$R^5$ denotes a group —CH=CH—$CH_3$,
$a$ is 1, and
$b$ is an integer of average value 6, or
$R^1$ denotes a group of formula XII,
$R^2$ and $R^4$ both denote carbonyl groups,
$R^3$ denotes a single bond,
$R^5$ denotes a phenyl group,
$a$ is 1, and
$b$ is an integer of average value 6.

* * * * *